United States Patent
Withers, Jr. et al.

(10) Patent No.: US 7,087,102 B2
(45) Date of Patent: Aug. 8, 2006

(54) PROCESS FOR PURIFICATION OF GERMANE

(75) Inventors: Howard Paul Withers, Jr., Breinigsville, PA (US); Philip Bruce Henderson, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 266 days.

(21) Appl. No.: 10/788,223

(22) Filed: Feb. 26, 2004

(65) Prior Publication Data

US 2005/0191854 A1   Sep. 1, 2005

(51) Int. Cl.
*B01D 53/04* (2006.01)

(52) U.S. Cl. .............. 95/116; 95/117; 95/139; 423/645

(58) Field of Classification Search .......... 95/116, 95/117, 139, 45, 55, 901, 902, 903; 96/132; 423/645

See application file for complete search history.

(56) References Cited

U.S. PATENT DOCUMENTS

| | | | |
|---|---|---|---|
| 3,577,220 A | | 5/1971 | Kuratomi et al. |
| 4,565,677 A | * | 1/1986 | Yusa ............... 423/219 |
| 4,656,013 A | | 4/1987 | Hiai et al. |
| 4,668,502 A | | 5/1987 | Russotti |
| 4,824,657 A | | 4/1989 | Jadhav |
| 5,158,656 A | | 10/1992 | Ayers |
| 6,716,271 B1 | * | 4/2004 | Arno et al. ............ 95/133 |
| 2005/0106090 A1 | * | 5/2005 | Agarwal et al. ....... 423/244.01 |
| 2005/0120877 A1 | * | 6/2005 | Wu et al. .............. 85/117 |

FOREIGN PATENT DOCUMENTS

| | | |
|---|---|---|
| BE | 890356 | 1/1982 |
| JP | 60221301 | 11/1985 |
| JP | 60221322 | 11/1985 |
| JP | 62017004 | 1/1987 |
| JP | 10291804 | 11/1998 |
| RU | 1 732 697 A1 | 10/1995 |

OTHER PUBLICATIONS

T. S. Piper, et al., "The Preparation of Germane," J. Inorg. & Nuclear Chem. (1957), 4, 2, p. 22-23.

J. E. Griffiths, "Monogermanes—Their Synthesis and Properties," J. E. Inorg. Chem. (1963), 2(2), p. 375-377.

(Continued)

*Primary Examiner*—Frank M. Lawrence
(74) *Attorney, Agent, or Firm*—Rosaleen P. Morris-Oskanian

(57) ABSTRACT

A process and system for the synthesis and/or purification of crude germane to provide a purified germane product are disclosed herein. In one aspect of the present invention, there is provided a process for making a purified germane product containing less than 1 volume percent of one or more germanium-containing impurities comprising: providing a crude germane fluid; passing at least a portion of the crude germane fluid through a first adsorbent which selectively adsorbs water and carbon dioxide contained therein and withdrawing therefrom a partially purified germane fluid; passing at least a portion of the partially purified germane fluid through a second adsorbent which selectively adsorbs the one or more germanium-containing impurities contained therein and withdrawing therefrom a hydrogen-enriched purified germane fluid; and separating the purified germane product hydrogen from the hydrogen-enriched purified germane fluid.

27 Claims, 2 Drawing Sheets

OTHER PUBLICATIONS

A. A. Efremov, et al., "Adsorption of Ultrapure Volatile Inorganic Hydrides on Different Adsorbents," Plenum Publishing Corporation (1992), p. 468-474.

A. M. Tolmachev, et al., "Deep Purification of Hydrides by the Adsorption Method," Plenum Publishing Corporation (1988), p. 240-244.

V. Y. Orlov, et al., "Deep Purification of Hydrides by the Adsortion Method," Plenum Publishing Corporation (1988), p. 245-248.

A. A. Efremov, et al., "Some Questions Concerning the Dynamics and Efficency of Sorption Purification in the Trace Concentration Range," Plenum Publishing Corporation (1991), p. 255-267.

J. E. Drake, et al., "Hydrides of Germanium," J. Chem. Soc. (1962), p. 2807-2813.

A. D. Zorin, et al., "Preparation of Monogermane by the Reaction of Germanium (IV) Chloride with Sodium and Potassium Terahydroborates," Russian Journal of Inorganic Chemistry, 15 (8), (1970), p. 1048-1050.

L. M. Antipin, et al., "Reactions of Germanium Tetrachloride with Potassium and Sodium Tetrahydroborates," Russian Journal of Inorganic Chemistry, 13 (2), (1968), p. 162-164.

W. L. Jolly, "The Preparation of the Volatile Hydrides of Groups IV-A and V-A by Means of Aqueous Hydroborate," J. Amer. Chem. Soc. (1961), Vo. 83, p. 335-337.

G. G Devyathykh, et al., "Electrochemical Synthesis of Specifically Pure Germane," Plenum Publishing Corporation (1988), p. 235-239.

E. D. Macklen, "Preparation of Germane. Part I. Reaction between Lithium Aluminum Hydride and Germanium Tetrachloride," J. Chem. Soc. (1959), p. 1984-1988.

E. D. Macklen, "Preparation of Germane. Part II. Reaction between Sodium Borohydride and Germanium Tetrachloride," J. Chem. Soc. (1959), p. 1989-92.

S. Sujishi, et al., "Reactions of Germanium Tetrachloride with Lithium Aluminohydrides. Lithium Tri-*t*-butoxyaluminohydride as an Efficient Reagent for the Preparation of Germane," J. Amer. Chem. Soc. (1958), vol. 80, p. 4138-4140.

* cited by examiner

PROCESS FOR PURIFICATION OF GERMANE

BACKGROUND OF THE INVENTION

In numerous industrial and commercial processes, it may be desirable to provide high purity germane. One area in which high purity germane is typically required is in the fabrication of semiconductor devices such as transistors, diodes, integrated circuits, detectors, solar cells, and the like. In many of these applications, high purity germane is oftentimes used as a gas for doping substrates. More recently, the commercial use of germanium tetrahydride by the semiconductor and solar cell manufacturers has steadily increased because of new technology that incorporates germanium into active silicon structures. This new technology requires that germane be produced at higher purity levels with less variability in impurity concentrations and a lower cost than present manufacturing methods.

There are many known methods for the production and synthesis of germane. Typical synthesis methods may be categorized as a chemical reduction method, an electrochemical reduction method, or a plasma synthesis method. The chemical reduction method typically involves contacting a germanium-containing compound such as germanium tetrachloride, germanium oxide, a germanide, and/or elemental germanium with a reducing agent such as, but not limited to, sodium borohydride, potassium borohydride, lithium borohydride, lithium aluminum hydride, sodium aluminum hydride, lithium hydride, sodium hydride, or magnesium hydride. In one common chemical reduction method, a germanium-containing compound is added to an aqueous acid solution which is then subsequently added to an aqueous solution containing the reducing agent sodium borohydride to conduct the chemical reduction reaction. Other chemical reduction methods may use an organic solvent solution rather than an aqueous solution as the reaction medium or may use the reaction of germanides with acid. The electrochemical reduction method, on the other hand, typically involves applying voltage to a germanium metal cathode that is immersed in an aqueous electrolyte solution and an anode counter-electrode composed of a metal such as molybdenum or cadmium. In this method, germane and hydrogen gases evolve from the cathode while the anode reacts to form solid molybdenum or cadmium oxides. Yet another electrochemical reduction method may involve applying voltage between a cathode, comprised of a standard material such as nickel or tin, and an anode of standard material that are immersed in an aqueous electrolyte solution containing a germanium-containing compound to produce a germanium and hydrogen-containing gaseous product evolving at the cathode. Lastly, the plasma synthesis method involves bombarding elemental germanium with hydrogen atoms (H) that are generated using a high frequency plasma source to provide various reaction products such as $GeH_4$ and $Ge_2H_6$.

Typical synthesis methods traditionally produce germane that may be contaminated with variable amounts of germanium-containing impurities such as, but not limited to, higher order germane compounds (i.e., digermane, trigermane, etc.), chlorogermanes, and germoxanes. Further, germane can slowly decompose during storage to generate variable amounts of these germanium-containing impurities. These germanium-containing impurities may make the germane unusable for its end-use application due to the negative impact on deposited film properties and on process control and processing. In this connection, higher amounts of the germanium-containing impurities may effect the incorporation of germanium into active silicon structures and generate unacceptable levels of defects in the structures.

There is a need in the art for a commercial scale, cost-effective process for the synthesis and/or purification of germane that gives higher purity germane and less variability in impurity concentrations.

BRIEF SUMMARY OF THE INVENTION

A process for the synthesis and/or purification of crude germane to provide a purified germane product is disclosed herein. In one aspect of the present invention, there is provided a process for making a purified germane product containing less than 1 volume percent of one or more germanium-containing impurities comprising: providing a crude germane fluid; passing at least a portion of the crude germane fluid through a first adsorbent which selectively adsorbs water and carbon dioxide contained therein and withdrawing therefrom a partially purified germane fluid; passing at least a portion of the partially purified germane fluid through a second adsorbent which selectively adsorbs the one or more germanium-containing impurities contained therein and withdrawing therefrom a hydrogen-enriched purified germane fluid; and separating the purified germane product from the hydrogen-enriched purified germane fluid.

In a further aspect of the present invention, there is provided a process for making a purified germane product containing less than 1 volume percent of one or more germanium-containing impurities comprising: contacting a germanium-containing compound with a reducing agent to provide a crude germane fluid comprising germane, germanium-containing impurities, hydrogen, water, and carbon dioxide; optionally cooling the crude germane fluid to at least partially remove the water contained therein; passing at least a portion of the crude germane fluid through a first adsorbent which selectively adsorbs water and carbon dioxide and withdrawing therefrom a partially purified germane fluid; passing at least a portion of the partially purified germane fluid through a second adsorbent which selectively adsorbs the one or more germanium-containing impurities and withdrawing therefrom a hydrogen-enriched purified germane fluid; and separating the purified germane product from the hydrogen-enriched purified germane fluid.

In yet another aspect of the present invention, there is provided a process for the removal of one or more germanium-containing impurities from a crude germane fluid comprising: passing at least a portion of the crude germane fluid through a first adsorbent which selectively adsorbs water and carbon dioxide contained therein and withdrawing therefrom a partially purified germane fluid; and passing at least a portion of the partially purified germane fluid through a second adsorbent which selectively adsorbs the one or more germanium-containing impurities contained therein and withdrawing therefrom a purified germane product wherein an effective pore diameter of the second adsorbent is equal to or greater than an effective pore diameter of the first adsorbent.

DETAILED DESCRIPTION OF THE INVENTION

A process for the synthesis and/or purification of crude germane to provide a purified germane product is disclosed herein. The process of the present invention reduces the amount of germanium-containing impurities such as, but not limited to, higher order germanes (i.e., digermanes, trigermanes, etc.), chlorogermanes, germoxanes, etc., to provide a purified germane product. The purified germane product has less than 1 volume percent, or less than 1000 parts per million (ppm) volume, or less than 100 ppm volume, or less than 10 ppm volume, or less than 1 ppm volume germanium-containing impurities. In certain embodiments, the purification of the crude germane is conducted immediately as it is flowing out of the synthesis system, which is referred to herein as an "in-line" process. In these embodiments, yields of greater than 80% by volume, greater than 90% by volume, or greater than 95% by volume of a purified germane product can be achieved. In alternative embodiments, the purification is conducted from a previously synthesized crude germane such as, for example, a crude germane synthesized in another production facility.

The term "ambient temperature", as used herein, relates to one or more temperatures that range from −30° C. to 80° C, or from 10 to 40° C. The term "adsorption" or "adsorb", as used herein, relates to a process, which may be reversible, whereby certain components of a mixture adhere to the surface of solid bodies that it contacts.

Figure 1:
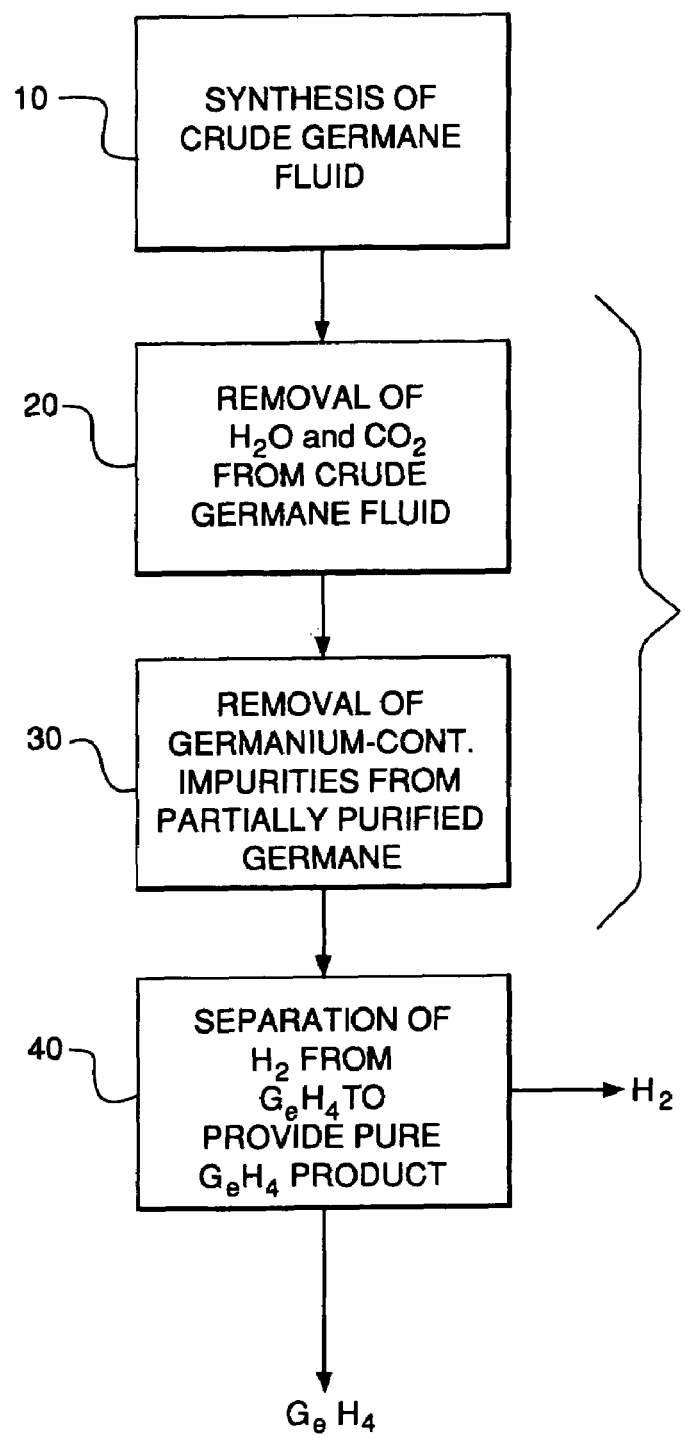
FIG. 1 provides a flow chart of one embodiment of the process of the present invention.

FIG. 1 provides a flow chart of an exemplary embodiment of an in-line process of the present invention wherein the purification process, or steps 20 and 30, are conducted after synthesis of a crude germane fluid. The term "fluid" as used herein denotes liquid as well as gaseous forms and combinations thereof of a compound. In step 10, a crude germane fluid is synthesized using any of the known processes. In certain embodiments, the crude germane fluid is prepared using a chemical reduction method such as those methods described, for example, in the following references which are incorporated herein by reference in their entirety: U.S. Pat. Nos. 3,577,220, 4,656,013, 4,668,502, and 4,824,657; Belgium patent BE 890356; Japanese patent applications 10291804, 62017004, 60221322, and 60221301; Emons, H. H., et al., "Preparation of Monogermane and Metallic Germanium of High Purity", Z. Chem. Vol. 23 (9), (1983), pp. 349–50; Zhou Z., et al., "Synthesis of XHn Type Gas Molecules", Huaxue Tongbao, Vol. 1 (1998), pp. 28–31; Devyatykk, G. G. et al., "Preparation of Germane by Treating Germanium Tetrachloride with Diisobutylaluminum Hydride", Zh. Neorg. Khim., Vol. 16(10) (1971), pp. 2617–20; Zorin, A. D. et al., "Preparation of Monogermane by Treating Germanium Tetrachloride with Sodium and Potassium Borohydrides, Zh. Neorg. Khim., Vol. 15(8) (1970), pp. 2032–35; Antipin, L. M. et al., "Reaction of Germanium Tetrachloride with Potassium and Sodium Borohydrides, Zh. Neorg. Khim., Vol. 12(2) (1968), pp. 313–26; Griffiths, J. E., "Monogermanes—Their Synthesis and Properties", Inorg. Chem., Vol, 2(2) (1963), pp. 375–77; Drake, J. E., et al., "Hydrided of Germanium", J. Chem. Soc. (1962), pp. 2807–13; Jolly W. L., "The Preparation of Volatile Hydrides of Groups IV-A and V-A by Means of Aqueous Hydrobrate", J. Amer. Chem. Soc., Vol. 83 (1961), pp. 335–37; Macklen, E. D., "Preparation of Germane. Part I. Reaction between Lithium Aluminum Hydride and Germanium Tetrachloride", J. Chem. Soc. (1959), pp. 1984–88; Macklen, E. D., "Preparation of Germane. Part II. Reaction between Sodium Borohydride and Germanium Tetrachloride", J. Chem. Soc. (1959), pp. 1989–92; Sujishi, S., "Reaction of Germanium Tetrachloride with Lithium Aluminohydrides. Lithium tri-t-butyoxyaluminohydride as an Efficient Reagent for the Preparation of Germane, J. Amer. Chem. Soc., Vol. 80 (1958), pp. 4138–40; and Piper, T. S., et al., "The Preparation of Germane", J. Inorg. & Nuclear Chem., Vol. 4, pp. 22–23 (1957).

In one embodiment, synthesis step 10 may be conducted using a chemical reduction method. In this embodiment, one or more germanium-containing compounds such as, for example, germanium oxide, germanium tetrachloride, a germanide (e.g., magnesium germanide, aluminum germanide, or sodium germanide), a elemental germanium, or mixtures thereof, is contacted with one or more reducing agents to provide a reaction mixture. Examples of suitable reducing agents include, but are not limited to, sodium borohydride, potassium borohydride, lithium borohydride, lithium aluminum hydride, sodium aluminum hydride, lithium hydride, sodium hydride, magnesium hydride, calcium hydride, diisobutylaluminum hydride, alkyl aluminum hydride, trialkylaluminum, lithium tri-t-butoxyaluminohydride, and sodium dihydrobis(2-methoxyethoxy) aluminate, or mineral acids. The molar ratio of germanium-containing compound to reducing agent in the reaction mixture may range from 1:1 or from 1:20.

The reaction may be conducted in an aqueous medium, non-aqueous medium such as an organic solvent or acid, or combinations thereof. In one embodiment, the germanium-containing compound is dissolved in an aqueous medium to which a reducing agent is gradually added thereto to provide the reaction mixture. In these embodiments, the aqueous medium may further include one or more acids such as, but not limited to, hydrobromic, sulfuric, or hydrochloric acid. In certain embodiments, the reducing agent may be added in an aqueous solution or an aqueous alkaline solution. The reaction mixture may be agitated to enhance the contact between the germanium-containing compound and the reducing agent. Agitation may be achieved, for example, by ultrasonic energy or mechanical agitation. The chemical reduction reaction is conducted at one or more temperatures ranging from −30° C. to 80° C. or below 40° C. Cooling may be provided to the reactor to maintain the desired temperature. The chemical reduction reaction is conducted at one or more pressures ranging from 50 torr to 200 psig or from 0 to 25 psig. In certain embodiments, the crude germane fluid may be passed through one or more optional cooling zones such as cold traps or condensers that are operated at a temperature range of from −80° C. to 15° C. and at a pressure range of from 50 torr to 200 psig. In these embodiments, a preferred temperature may be 0° C. and a preferred pressure range may be from 0 to 25 psig.

In an alternative embodiment, synthesis step 10 is conducted using an electrochemical reduction method. Examples of suitable electrochemical reduction methods are provided in U.S. Pat. No. 5,158,656; Russian Patent SU 1732697; and Devyatykh, G. G., et al., "Electrochemical Synthesis of Ultrapure Germane", Vysokochist. Veshchestva (1988), Vol. 2, pp. 60–64, which are incorporated herein by reference in their entirety.

In yet another embodiment, synthesis step 10 is conducted using a plasma synthesis method. An example of a plasma synthesis method is provided, for example, in the reference Shishkin, Yu, et al., "Effect of Some Experimental Parameters of a High Frequency Source of Atomic Hydrogen on Yield of Product in Germanium(s)+Atomic Hydrogen→Germanium Hydride", Izv. Sib. Otd. Akad. Nauk SSSR, Ser. Khim. Nauk, Vol. 4 (1985), pp. 117–24.

Referring again to FIG. 1, after synthesis step 10 is conducted, the crude germane fluid is passed through purification steps 20 and 30. Depending upon the synthesis method, the crude germane fluid may contain 80% or greater, 90% or greater, or 95% or greater by volume hydrogen with the balance being germane (GeH$_4$), germanium-containing impurities, CO$_2$, and H$_2$O. After synthesis, the crude germane fluid may be passed through an optional cooling zone (not shown) such as one or more cold traps or condensers to reduce the H$_2$O contained therein. In step 20, the crude germane fluid is passed through a first adsorbent to remove the CO$_2$ and H$_2$O contained therein and provide a partially purified germane fluid. The first adsorbent may be comprised of any of the many commercially available materials such as carbon molecular sieves and zeolite molecular sieves. In certain embodiments, the first adsorbent may be comprised of a zeolite molecular sieve. In these embodiments, the effective pore diameter of the molecular sieve is preferably 4 Angstroms or less such as a 4A (NaA) zeolite, small pore mordenite, ferrierite, Zeolite F, and/or Zeolite W molecular sieve. In certain embodiments, the first adsorbent is a 4A molecular sieve. In alternative embodiments, however, the effective pore diameter may be greater than 4 Angstroms such as, for example, a 5A (CaA), 13X (NaX), NaY, NH$_4$Y, HY, USY, dealuminated Y, L, lithium LSX, a faujasite structured zeolite, large pore mordenite, chabazite, ZSM-5, and/or beta type, molecular sieve. The crude germane fluid is passed through the first adsorbent at one or more temperatures ranging from −20° C. to 100° C. and one or more pressures ranging from 50 torr to 100 psig.

In step 30, the partially purified germane is then passed through a second adsorbent to provide a hydrogen-enriched purified germane. Like the first adsorbent, the second adsorbent may be comprised of any of the many commercially available materials such as activated carbons, carbon molecular sieves, zeolite molecular sieves, silica gels and activated alumina. In certain embodiments, the second adsorbent may be comprised of a zeolite. In these embodiments, the effective pore diameter of the sieve is greater than 4 Angstroms such as a 5A (CaA), 13X (NaX), NaY, NH$_4$Y, HY, USY, dealuminated Y, L, lithium LSX, a faujasite structured zeolite, large pore mordenite, chabazite, ZSM-5, and/or beta type, molecular sieve. In certain embodiments, the second adsorbent is a 13X molecular sieve. The crude germane fluid is passed through the second adsorbent at one or more temperatures ranging from −20 to 100° C. and one or more pressures ranging from 50 torr to 100 psig.

FIG. 1 shows the purification step being conducted in two discrete steps using two separate adsorbents. However, in other embodiments, the purification step may be conducted in one step using a single or a layered adsorbent. In the later embodiment, the layered adsorbent may be comprised of a first adsorbent having an effective pore diameter of 4 angstroms or less at the fluid inlet side and a second adsorbent having an effective pore diameter greater than 4 angstroms at the fluid outlet side. The length of the first and second adsorbents with respect to each other and the overall length of the layered adsorbent may vary depending upon a variety of factors such as the flow rate of the crude germane fluid, the amount of impurities contained within the crude germane fluid, and whether the optional cooling step was conducted.

Referring again to FIG. 1, in step 40, hydrogen contained within the hydrogen-enriched purified germane fluid is separated from the fluid to provide the purified germane product. While FIG. 1 shows step 40 as occurring after purification steps 20 and 30 are completed, step 40 may be conducted before steps 20 and 30 or in-between steps 20 and 30. The separation step may be conducted in a variety of ways, such as but not limited to, distillation, recrystallization, evaporation, membrane separation, adsorption, extraction, and combinations thereof. In one embodiment, the hydrogen-enriched purified germane fluid is passed into a collection vessel that is cooled sufficiently to condense the purified germane and allow the hydrogen gas to pass through to vent.

Figure 2:
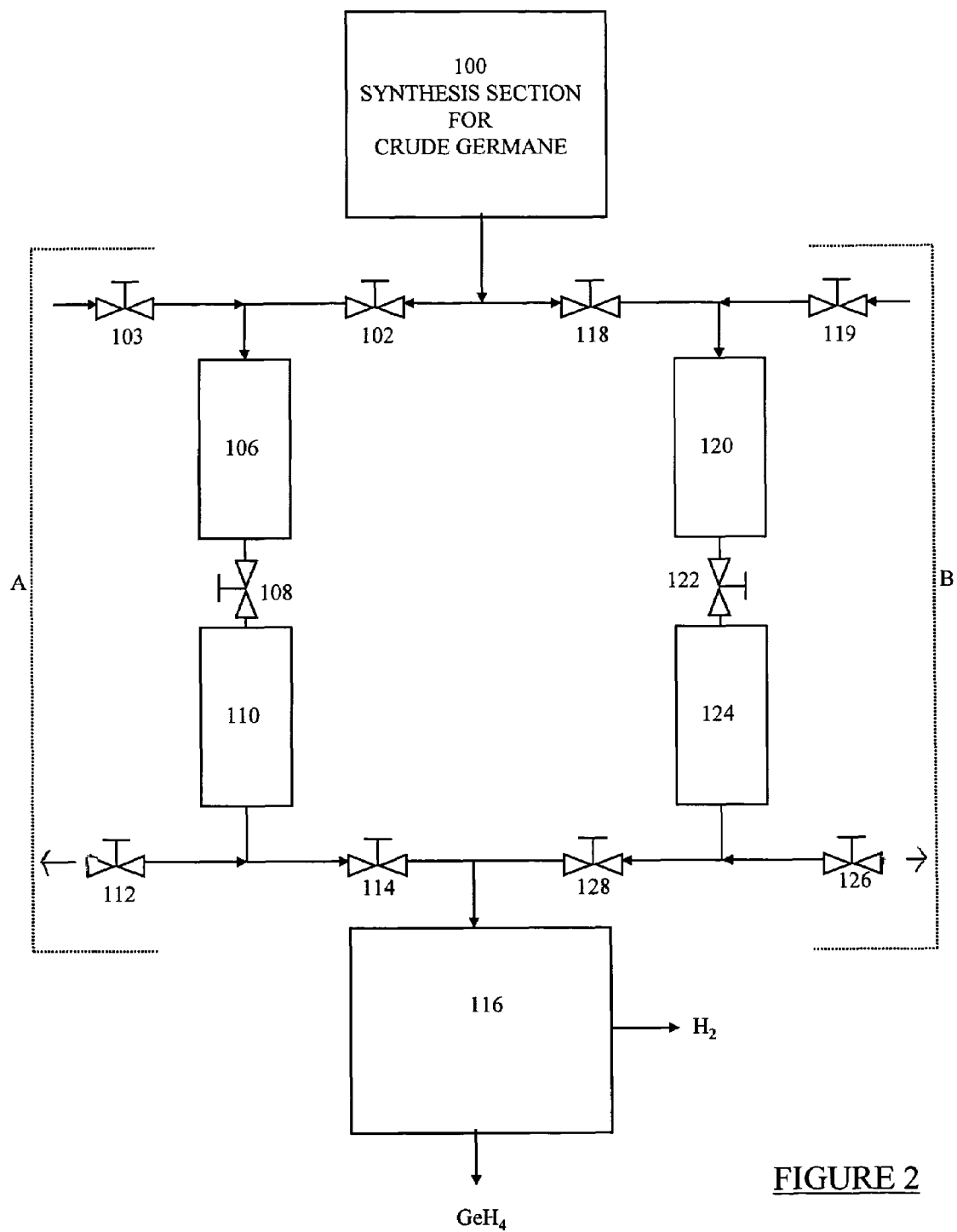
FIG. 2 provides an illustration of one embodiment of a system wherein a crude germane is synthesized and then purified.

FIG. 2 provides an embodiment of a system used for the in-line synthesis and production process of the present invention having parallel redundant purification sub-systems A or B. Parallel purification systems A or B allow for continuous processing of the crude germane fluid by allowing for the desorption and regeneration of the adsorbent columns that are not in use once breakthrough, i.e., a higher concentration of germanium-containing impurities in the purified germane product, has occurred. Crude germane fluid is synthesized in reactor 100 using any of the synthesis methods disclosed herein. If purification sub-system A is used, crude germane fluid is passed through valve 102 and valve 118 is closed. Crude germane fluid is typically at ambient temperature and a pressure that ranges from 0.04 to 200 psia upon entering first adsorbent column 106. First adsorbent column 106 operates at or near ambient temperature and contains an adsorbent material, which selectively adsorbs the condensable components such as CO$_2$ and water from the crude germane fluid to provide a partially purified germane fluid. Valve 108 allows the partially purified germane fluid to flow to the second adsorbent column 110. In certain embodiments, the effective pore diameter of the adsorbent contained within the second adsorbent column is greater than the effective pore diameter of the adsorbent contained within the first adsorbent column. Like the first adsorbent column, second adsorbent columns 110 operates at or near ambient temperature and contains an adsorbent material which selectively adsorbs certain components of the fluid such as the germanium-containing impurities to provide a hydrogen-enriched purified germane fluid which flows through valve 114 into condenser 116.

The hydrogen-enriched purified germane fluid flowing into condenser 116 contains a purified germane product with less than 1 volume percent, or less than 1000 parts per million (ppm) volume, or less than 100 ppm volume, or less than 10 ppm volume, or less than 1 ppm volume germanium-containing impurities and 80% or 90% or 95% by volume or greater hydrogen gas. At this time valves 102, 108, and 114 are open and valves 103, 112, 118, 122, and 128 are closed. Crude germane fluid flows through adsorbent columns 106 and 110 in sub-system A until the adsorbents' working capacity approaches breakthrough. When breakthrough occurs, the flow of crude germane gas through purification sub-system A is discontinued and the sub-system is isolated by closing valves 102 and 114. The flow of crude germane fluid is switched to purification sub-system B by opening valves 118, 122, and 128 to provide to provide a hydrogen-enriched purified germane fluid in condenser 116. Purification sub-system B is identical to purification sub-system A and contains freshly regenerated adsorbent columns 120 and 124 containing the same type of adsorbents as columns 106 and 110, respectively. As FIG. 2 shows, the purified germane is then isolated and separately removed from condenser 116 wherein the hydrogen is vented.

The regeneration of adsorbent columns 106 and 110 in sub-system A is performed by flowing an inert purge gas such as helium or nitrogen at 0 to 100 psig through the columns and heating the gas to 100° C. to 300° C. using a heater (not shown). Valves 103, 112, and 108 are opened and a heated purge gas is passed into valve 103 through adsorbent columns 106 and 110 and purge gas effluent is withdrawn through valve 112. Valves 102 and 114 remain closed to isolate purification sub-system A during the regeneration step. Alternatively, vacuum can be applied to the columns instead of or in combination with flowing purge gas. The concentration of the germanium-containing impurities in the purge gas effluent varies with time as desorption occurs during the regeneration step.

The invention will be illustrated in more detail with reference to the following Examples, but it should be understood that the present invention is not deemed to be limited thereto. The gas chromatograph ("GC") analyses were carried out on an Agilent Technologies Inc. Model 6890 GC instrument with a thermal conductivity detector using a 30-meter×0.53 mm MXT-1 column manufactured by Restek Corp.

EXAMPLES

Example 1

A 3.3-gram sample of crude germane containing 1.2 volume percent digermane, $Ge_2H_6$, was passed through a stainless steel column (0.43-inch inner diameter and 12-inch length) that contained 16.8 grams of molecular sieve (mol. sieve) 13X (8–12 mesh spheres manufactured by Aldrich Chem. Co.). The sample was passed through the column at ambient temperature and a pressure that ranged from 2 to 177 Torr until 3.2 grams, or 97% of the original crude weight, of the purified germane was collected downstream in a cold trap. Upon warming to room temperature, gas chromatographic analysis of the collected germane showed that the digermane concentration had been lowered to 10 ppmv.

Example 2

A portion of a 13.7 gram sample of crude germane that contained 1.7 vol % of digermane and a detectable amount (>1 ppmv as measured by GC) of trigermane was passed through the same mol. sieve 13X column used in Example 1. The crude germane was passed through the mol. sieve 13X column at a pressure of 18 psig and column temperature of 30° C. until 11.5 grams of purified germane was collected downstream in a cold trap. Upon warming to room temperature, GC analysis of the collected germane showed the digermane concentration had been lowered to 1.3 ppmv and the trigermane concentration was below the detection limit, or less than 1 ppmv.

The cold trap was recooled and the flow of remaining crude germane was continued through the mol. sieve 13X column until another 1.8 grams of germane was collected giving a total of 13.3 grams, or 97% of the original crude weight of germane collected. GC analysis showed the digermane concentration was 4.5 ppmv and the trigermane concentration was still below the detection limit. The present example illustrates that stepwise processing can be used without adverse effect.

Example 3

Crude germane was prepared through the aqueous sodium borohydride reduction of aqueous Ge(IV) ions. A 1 liter glass reactor flask equipped with a magnetic stirring bar was charged with 700 mL of water and purged with helium to remove all the air contained therein. Germanium tetrachloride ($GeCl_4$, 14.8 grams) was then added to the reactor. A solution of the reducing agent $NaBH_4$ (15.7 g) in 100 mL of water was then added over a 1 hour period to the reactor flask through an addition funnel fitted on top of the flask. Under constant stirring the reaction mixture temperature was maintained below 40° C. using a water bath.

A gaseous, germane/hydrogen reaction product, containing about 5 vol % concentration crude $GeH_4$ and about 95 vol % gaseous $H_2$, evolved from the reaction mixture and was drawn out of the flask through a cooling condenser maintained at 0° C. to lower the dew point. From the condenser, the germane/hydrogen gas reaction product was passed through a stainless steel column (0.43-inch inner diameter and 12-inch length) containing 18.5 grams of molecular sieve 4A (8–12 mesh spheres from Aldrich Chem. Co.) at room temperature (22° C.) and 0 psig to remove water and carbon dioxide contained therein. The germane/hydrogen mixture was then passed into a collection vessel cooled in liquid nitrogen, which condensed out the germane and higher boiling impurities but vented the hydrogen. After all the $NaBH_4$-water solution was added to the reactor, the reactor was purged with helium for 15 minutes to flush all remaining traces of $GeH_4$ into the collection vessel. While still immersed in the liquid $N_2$, a vacuum was applied to the collection vessel to remove all of the $H_2$ and other non-condensable gases, until the pressure was less than 5 millitorr. The vessel was then allowed to warm to room temperature. The amount of $GeH_4$ isolated was 4.3 grams (81% yield) and GC analysis of the $GeH_4$ showed it contained 1.2 vol % digermane, $Ge_2H_6$ and <1 ppmv of $CO_2$.

Example 4

Crude germane was prepared using the method described in Example 3 but this time passed through a molecular sieve 13X column (the same one used in Examples 1 and 2) as it was evolving from the reactor. The 13X mol. sieve column was positioned in-line between the molecular sieve 4A column used in Example 3 and the cryogenic germane collection vessel. The same batch size was run using the same conditions as the Example 3. The collected germane yield was 79% and gas chromographic analysis showed it contained only 7.5 ppmv of digermane and <1 ppmv of $CO_2$.

Example 5

Following the method of Example 3, 225 g of $GeCl_4$ was added to 13.3 L of water that contained 292.7 g of conc. aq. HCl in a 5 gallon reactor equipped with a magnetic stirring bar and cooling coils. To this aqueous Ge(IV) solution in the reactor was added, by metering pump, a solution of 238 g of $NaBH_4$ in 1.9 L of water that contained 9.7 g of NaOH. The gaseous germane and hydrogen mixture that evolved from the reactor passed at 0 psig and 23° C. through a bed of 4A mol. sieve (246 g in a 1.8-inch i.d. by 8.0-inch long column), then through a bed of 13X mol. sieve (88 g in a 1.3-inch i.d. by 5.5-inch long column), and then into a cryogenic collection vessel. The collected germane yield was 74 g (92%) and GC analysis showed it contained 5 ppmv of digermane, 7 ppmv $N_2$ and 1 ppmv $CO_2$. No trigermane was detected.

Example 6

The mol. sieve 13X bed can be regenerated by heating and purging with an inert gas and reused repeatedly without degradation of performance. The 4A and 13X mol. sieve beds used in Example 5 were reactivated by heating to 200 to 300° C. under a purge of dry helium for 4 to 12 hrs, then cooled to 23° C. under a purge of dry He. Following the method of Example 5, 224.6 g of $GeCl_4$ was added to 13.3 L of water that contained 292.7 g of concentrated aqueous HCl in the same reactor setup to provide an aqueous Ge(IV) solution. To the aqueous Ge(IV) solution was added a solution of 238 g of $NaBH_4$ and 9.7 g of NaOH in 1.9 L of water to provide a reaction mixture from which the crude $GeH_4/H_2$ mixture evolved and passed into the purification/collection part of the system. The spent reaction mixture from this reaction was drained from the 5 gallon reactor and a second batch was immediately run in which 228.6 g of $GeCl_4$ was added to 13.3 L of water that contained 292.7 g of concentrated aqueous HCl in the reactor. To this aqueous Ge(IV) solution was added a solution of 242 g of $NaBH_4$ and 9.8 g of NaOH in 1.9 L of water evolving a second batch of crude $GeH_4/H_2$ that passed into the purification/collection part of the system. The collected germane yield was 150.7 g (93%) and GC analysis showed the $GeH_4$ contained 8 ppmv of digermane, 3 ppmv $N_2$, and <1 ppmv $CO_2$.

The invention claimed is:

1. A process for making a purified germane product containing less than 1 volume percent of one or more germanium-containing impurities, the process comprising:
   providing a crude germane fluid;
   passing at least a portion of the crude germane fluid through a first adsorbent which selectively adsorbs water and carbon dioxide contained therein and withdrawing therefrom a partially purified germane fluid;
   passing at least a portion of the partially purified germane fluid through a second adsorbent which selectively adsorbs the one or more germanium-containing impurities contained therein and withdrawing therefrom a hydrogen-enriched purified germane fluid; and
   separating the purified germane product from the hydrogen-enriched purified germane fluid.

2. The process of claim 1 further comprising cooling the crude germane fluid to at least partially remove water contained therein.

3. The process of claim 1 wherein the providing step comprises contacting a germanium-containing compound with a reducing agent to provide the crude germane fluid.

4. The process of claim 3 wherein the germanium-containing compound is at least one selected from germanium tetrachloride, germanium oxide, a germanide, and elemental germanium.

5. The process of claim 3 wherein the reducing agent is at least one selected from sodium borohydride, potassium borohydride, lithium borohydride, lithium aluminum hydride, sodium aluminum hydride, lithium hydride, sodium hydride, magnesium hydride, calcium hydride, diisobutylaluminum hydride, alkyl aluminum hydride, trialkylaluminum, lithium tri-t-butoxyaluminohydride, sodium dihydrobis(2-methoxyethoxy) aluminate, and mineral acid.

6. The process of claim 1 wherein the providing step comprises an electrochemical reduction of at least one germanium-containing compound.

7. The process of claim 6 wherein the germanium-containing compound is at least one selected from germanium tetrachloride, germanium oxide, a germanide, and elemental germanium.

8. The process of claim 1 wherein the providing step comprises contacting at least one germanium-containing compound with hydrogen atoms.

9. The process of claim 1 wherein the first adsorbent is a molecular sieve selected from 4A (NaA), small pore mordenite, ferrierite, Zeolite F, Zeolite W, a carbon molecular sieve, and combinations thereof.

10. The process of claim 9 wherein the molecular sieve is the 4A molecular sieve.

11. The process of claim 1 wherein the first adsorbent has an effective pore diameter greater than 4 angstroms.

12. The process of claim 1 wherein the second adsorbent has an effective pore diameter greater than 4 angstroms.

13. The process of claim 12 wherein the second adsorbent is a molecular sieve selected from 5A (CaA), 13X (NaX), NaY, $NH_4Y$, HY, USY, dealuminated Y, L, lithium LSX, a faujasite structured zeolite, large pore mordenite, chabazite, ZSM-5, beta type, and combinations thereof.

14. The process of claim 12 wherein the molecular sieve is a 13X molecular sieve.

15. The process of claim 1 wherein the second adsorbent comprises an adsorbent selected from silica, alumina, and activated carbon.

16. The process of claim 1 wherein the first and second adsorbents comprise a layered adsorbent.

17. The process of claim 16 wherein the layered adsorbent has a 4A molecular sieve at an inlet end and a 13X molecular sieve at an outlet end.

18. The process of claim 1 wherein the separating step is conducted by one or more methods selected from distillation, recrystallization, evaporation, membrane separation, adsorption, and extraction.

19. A process for making a purified germane product containing less than 1 volume percent of one or more germanium-containing impurities, the process comprising:
   contacting a germanium-containing compound with a reducing agent to provide a crude germane fluid comprising germane, germanium-containing impurities, hydrogen, water, and carbon dioxide;
   optionally cooling the crude germane fluid to at least partially remove the water contained therein;
   passing at least a portion of the crude germane fluid through a first adsorbent which selectively adsorbs water and carbon dioxide and withdrawing therefrom a partially purified germane fluid;
   passing at least a portion of the partially purified germane fluid through a second adsorbent which selectively adsorbs the one or more germanium-containing impurities and withdrawing therefrom a hydrogen-enriched purified germane fluid; and
   separating the purified germane product from the hydrogen-enriched purified germane fluid.

20. A process for the removal of one or more germanium-containing impurities from a crude germane fluid, the process comprising:
   passing at least a portion of the crude germane fluid through a first adsorbent which selectively adsorbs water and carbon dioxide contained therein and withdrawing therefrom a partially purified germane fluid; and
   passing at least a portion of the partially purified germane fluid through a second adsorbent which selectively adsorbs the one or more germanium-containing impurities contained therein and withdrawing therefrom a purified germane product wherein an effective pore diameter of the second adsorbent is equal to or greater than an effective pore diameter of the first adsorbent.

21. The process of claim 20 wherein the effective pore diameter of the second adsorbent is greater than the effective pore diameter of the first adsorbent.

22. The process of claim 21 wherein the first adsorbent is a molecular sieve selected from 4A (NaA), small pore mordenite, ferrierite, Zeolite F, Zeolite W, carbon molecular sieve and combinations thereof.

23. The process of claim 22 wherein the molecular sieve is the 4A molecular sieve.

24. The process of claim 21 wherein the second adsorbent is a molecular sieve selected from 5A (CaA), 13X (NaX), NaY, $NH_4Y$, HY, USY, dealuminated Y, L, lithium LSX, a faujasite structured zeolite, large pore mordenite, chabazite, ZSM-5, beta type, and combinations thereof.

25. The process of claim 24 wherein the molecular sieve is a 13X molecular sieve.

26. The process of claim 20 wherein the first and second adsorbents comprise a layered adsorbent.

27. The process of claim 26 wherein the layered adsorbent has a 4A molecular sieve at an inlet end and a 13X molecular sieve at an outlet end.

* * * * *